US007333942B1

(12) United States Patent
Cowles

(10) Patent No.: US 7,333,942 B1
(45) Date of Patent: Feb. 19, 2008

(54) NETWORKED INTERNATIONAL SYSTEM FOR ORGANIZATIONAL ELECTRONIC COMMERCE

(75) Inventor: Roger Cowles, Philadelphia, PA (US)

(73) Assignee: D-Net Corporation, Ridgefield Park, NJ (US)

(*) Notice: Subject to any disclaimer, the term of this patent is extended or adjusted under 35 U.S.C. 154(b) by 0 days.

(21) Appl. No.: 09/534,453

(22) Filed: Mar. 24, 2000

Related U.S. Application Data

(60) Provisional application No. 60/126,364, filed on Mar. 26, 1999.

(51) Int. Cl.
G06Q 30/00 (2006.01)
(52) U.S. Cl. .................... 705/26; 705/27; 705/37; 705/24; 709/203; 709/217; 709/218
(58) Field of Classification Search .............. 705/26, 705/27, 37, 14, 24; 707/104; 709/203, 217, 709/218
See application file for complete search history.

(56) References Cited

U.S. PATENT DOCUMENTS

| | | | | |
|---|---|---|---|---|
| 5,592,376 A * | 1/1997 | Hodroff | ........................ | 705/27 |
| 5,717,989 A | 2/1998 | Tozzoli et al. | | |
| 5,721,832 A * | 2/1998 | Westrope et al. | .............. | 705/27 |
| 5,758,328 A * | 5/1998 | Giovannoli | ................... | 705/26 |
| 5,802,497 A | 9/1998 | Manasse | | |
| 5,870,473 A | 2/1999 | Boesch et al. | ................. | 580/21 |
| 5,897,621 A | 4/1999 | Boesch et al. | ................. | 705/26 |
| 5,913,210 A * | 6/1999 | Call | ............................ | 705/20 |
| 5,918,214 A * | 6/1999 | Perkowski | ..................... | 705/27 |
| 5,968,110 A | 10/1999 | Westrope et al. | .............. | 703/27 |
| 5,987,429 A | 11/1999 | Martizen et al. | .............. | 705/31 |
| 5,999,913 A * | 12/1999 | Goodwin, III | ................ | 705/26 |
| 6,151,631 A | 11/2000 | Ansell et al. | ................ | 709/229 |
| 6,205,433 B1 * | 3/2001 | Boesch et al. | ................ | 705/26 |

(Continued)

FOREIGN PATENT DOCUMENTS

WO WO 01/55931 * 8/2001

(Continued)

OTHER PUBLICATIONS

"E-commerce—The Way To Go" Oct. 1997, Australian Accountant, v67n9, pp. 50-51.*

(Continued)

Primary Examiner—F. Zeender
Assistant Examiner—Christopher Buchanan

(57) ABSTRACT

A networked computer architecture (AgoraNet) facilitates and conducts secure electronic commerce based on national deployment independent of the Internet. A "publish and subscribe" model is used in which vendors may publish catalogs and information about product and service offerings to AgoraNet applications hosted at a national site. Subscribing organizations may browse and search vendor data using a Global Naming Service as well as search engines, agents, queries and a subscription service. Buyers and Sellers may communicate directly using an integrated messaging system. Buyers may obtain quotations from Sellers and calculate the Total Landed (delivered) cost of goods prior to purchase. Buyers may place Blanket and standard Purchase Orders and track order shipments to destination. Sellers receive payment electronically for goods and services. Orders for goods and services may be translated to XML or EDI formats and transmitted directly to subscriber order processing systems or serve as input to standard or customized supply chain management applications hosted at AgoraNet sites using AgoraNet for transport.

13 Claims, 9 Drawing Sheets

U.S. PATENT DOCUMENTS

| | | | |
|---|---|---|---|
| 6,219,653 B1* | 4/2001 | O'Neill et al. ................ | 705/26 |
| 6,418,441 B1* | 7/2002 | Call ............................ | 705/26 |
| 6,460,020 B1 | 10/2002 | Pool et al. | |
| 2001/0011222 A1* | 8/2001 | McLauchlin et al. .......... | 705/1 |
| 2001/0049651 A1* | 12/2001 | Selleck ........................ | 705/26 |
| 2002/0004753 A1* | 1/2002 | Perkowski ................... | 705/26 |
| 2002/0049607 A1* | 4/2002 | Perkowski ................... | 705/1 |

FOREIGN PATENT DOCUMENTS

| | | |
|---|---|---|
| WO | WO 01/97122 A1 * | 12/2001 |

OTHER PUBLICATIONS

Levey, Marc M. et al. "Cyberspace Transactions Present Interesting International, Stae and Local tax Issues" Nov./Dec. 1997, Tax Executive, v49n6, pp. 476-486.*

Maguire, Ned "Taxation of E-Commerce: An Overview" Sep. 1999, International Tax Review E-Commerce taxation: A Guide Supplement pp. 3-12.*

Anonymous, "Trade promotion", Business America, vol. 117 No. 9, Sep. 1996.*

Pearson, S., "Relationship management: generating business in the diverse markets of Europe", European Business Journal, vol. 6 No. 4, p. 28, 1994.*

Carol Slowa and Julia King, "B-To-B Hard to Spell with XML", Computerworld, Feb. 28, 2000.

Tim Wilson, "Exchanges Fall Short on Global Commerce", INTERNETWEEK, May 8, 2000.

www.syntra.com, "CLEARCROSS, Global Commerce Simplified", Jun. 25, 2000 (Best Available Copy, Examiner is encouraged to visit site for further information).

* cited by examiner

NETWORKED INTERNATIONAL SYSTEM FOR ORGANIZATIONAL ELECTRONIC COMMERCE

CROSS-REFERENCE TO RELATED APPLICATIONS

The present application claims priority from Provisional U.S. Patent Application Ser. No. 60/126,364, filed on Mar. 26, 1999 and incorporated herein by reference in its entirety.

FIELD OF THE INVENTION

The present invention relates to data processing systems, and more particularly, to international electronic commerce using electronic catalogs and automated processes to calculate delivered costs of goods and services.

BACKGROUND OF THE INVENTION

Advancements in computer technology and digital communications have made it possible for companies or organizations to conduct commerce electronically (e-commerce) using public or private networked computer systems. Such systems may generally provide a web server for customers or clients to execute transactions. There are presently no uniform standards for e-commerce, and thus there are many technical differences and inconsistencies between the data presentation, data organization, data content, databases and communications methods used in each of the systems used for e-commerce. As a result, it is largely impossible at the present time to conduct true "any to any" (buyer to seller) electronic commerce.

"Any to any" e-commerce may be defined here as the capability of any known or unknown commercial/government organization to electronically complete all of the processes to purchase or respond to an advertised or published request for proposal (RFP) for goods or services by a known or unknown seller, where such orders and RFPs are subject to applicable regulations and final acceptance by the seller.

Technologies currently existing to replace paper-based document exchange with electronic document exchange such as Extensible Markup Language (XML)/Electronic Data Interchange (EDI), World-Wide-Web (WWW) applications and extranets may require all trading partners be identified and in virtually all cases they adopt the same applications and use the same network, such as the Internet. These technologies do not lend themselves to open "any to any" business commerce because they typically use Web-based languages such as hypertext markup language (HTML), XML or other derivatives where no two implementations are exactly alike, making open "any to any" e-commerce very difficult or impossible.

Furthermore, the large number of Internet and WWW-based proprietary and custom e-commerce software products deployed may be so great that worldwide interoperability between these systems may be very difficult if not impossible. Such impediments are further greatly magnified in international commerce when currency, linguistic, tariff, trading partner, export control, trading bloc and other variables are added.

A further impediment to international e-commerce is the lack of a native global naming directory service presently implemented on the Internet or elsewhere. Unique, globally significant names may be required to identify organizations, trading partners and suppliers engaging in international "any to any" e-commerce. Services universally understood to be useful in locating information identifying organizations and/or entities such as the telephone directory "White" and "Yellow" pages are not available on the Internet except that a few WWW sites which enable users to retrieve information, directions and contact information for organizations based on a search of either actual telephone directories or a custom database.

The Internet has no complete "White" or "Yellow" pages or global naming service designed specifically to identify organizations. Rather, Internet sites are named and accessed by entering an Internet Domain Name System (DNS) address, (e.g., www.uspto.gov), which may need to be known before the site may be accessed. DNS addresses reference only the Internet Protocol (IP) addresses and domains of the hosts on which the WWW sites reside.

The Internet is by definition an unmanaged "network of networks" growing spontaneously worldwide. The primary Internet service, the World Wide Web, and WWW languages such as HTML and XML were created for document search/retrieval applications rather than electronic business commerce. The various HTML/XML standards and varying implementations at sites worldwide, along with thousands of proprietary e-commerce software products, make international business to business electronic commerce difficult and "any to any" e-commerce impossible.

Furthermore, most changes in the important variables for international e-commerce such as tariffs, exchange rates and export controls are determined on a national level. Widely dispersed, Internet site-based e-commerce systems have no way of immediately recognizing and updating the data available to commerce applications to reflect these changes. In addition, it may be extremely costly to establish and maintain an Internet-based e-commerce web site, so it may be much more cost effective to for a small or medium sized business to undertake a publish and subscribe e-commerce model.

Thus, a clear need exists in the art for a new computer architecture based on national (country) deployment designed specifically to enable governments, organizations, and entities located in each country to locate goods, services, and economic resources worldwide, to engage in a full range of purchasing, management, and supply chain activities and to receive payment by electronic funds transfer.

SUMMARY OF THE INVENTION

A new, integrated, networked computer architecture ("AgoraNet") is designed specifically to enable "any to any" business to business electronic commerce for subscribing organizations worldwide by means of national implementation, (i.e., with subscribing organizations connected to a site in a respective country). AgoraNet may be provided without features requiring a connection to the Internet. AgoraNet is designed specifically to enable "any to any (seller to buyer)" electronic commerce between organizations and entities located in different countries.

The present invention includes a networked computer architecture (AgoraNet) designed specifically to facilitate and conduct secure electronic commerce based on national deployment, (i.e., with organizations connected to one or more networked computer system sites located in each country which replicate and communicate data directly with each other). The new architecture may not require or depend on the Internet for any of its functions or services. It supports access to AgoraNet sites over multiple communications links including the Internet.

The system facilitates trade by enabling manufacturers, importers, exporters, brokers, forwarders and "end-user" organizations in each country to locate and purchase goods and services using country of origin, standard classification codes, agents, search engines and queries. Subscribers may also receive responses from AgoraNet applications, such as notifications concerning the purchase of certain products, when pre-determined purchase conditions such as price are met.

The system may comprise a minimum of one computer site in each country to which subscribing client organizations connect. AgoraNet applications provide multilevel access to information depending upon existing trading partner agreements, tariffs, export controls and customer/order characteristics. AgoraNet supports two new core applications: a "Virtual Open Trade Extranet" application designed to provide "any to any" (seller to buyer) electronic commerce and a "National Procurement and Resource Management" application designed to enable the electronic procurement of goods and services by national and regional governments.

These applications utilize the first commercial electronic commerce product catalog with a universal, extensible database structure which may accommodate any type of good or product. These catalogs may be created with an application allowing vendor catalog data to be entered using a "fill-in-the-template" data entry method for text and graphics. The vendor product information contained in these electronic catalogs may be analogous to a "Yellow Pages" service. This service eliminates the need to author, manage and update WWW-site HTML or XML pages for electronic commerce.

An AgoraNet subscriber web client computer running commercially available browser software may view, enter and retrieve data to/from AgoraNet systems over the Internet. However, this data entry and retrieval may not require authoring or maintaining HTML/XML pages at a subscriber location. AgoraNet may provide a "White Pages" service by implementing the Distributed Computing Environment Global Directory Service (GDS) for each subscriber and AgoraNet site/node.

The terms "White Pages" and "Yellow Pages" are used herein only to describe in a familiar and universally understood way some of the services included in AgoraNet. No claim is made to inventing a "White Pages" or "Yellow Pages" service as they are commonly used today within the context of telephone directories. The functionality described in this patent as "White Pages" and "Yellow Pages" denotes an altogether different functionality and implementation from telephone directories and may be an integral part of AgoraNet architecture.

The terms "Virtual Open Trading Extranet" (VOTE), "National Procurement and Resource Management System" (NPRMS) and "AgoraNet" are used and described here for the first time.

AgoraNet is designed as a secure, high-availability network which may continue to operate without interruption even if the Internet should suffer catastrophic failure or attack. Subscribers who wish to access AgoraNet applications using a World Wide Web connection may have the option of maintaining a dial-up, leased or other backup circuit capable of connecting an organization directly to the closest AgoraNet site. The AgoraNet backbone does not necessarily have to be connected to the Internet and does not necessarily depend upon the Internet for data or other communications transport.

AgoraNet is designed with a single, extensible architecture which may allow it to implement technical advances in processor, security, database, software, network, storage and circuit technology in a planned and coherent manner.

No new distributed computing architecture designed to scale worldwide may be built without utilizing some of the middleware, standards and established network technology which have been developed to this point. AgoraNet architecture uses the services of the Distributed Computing Environment (DCE), an open set of specifications and source code published by the Open Group, to support its functions and applications. The DCE services described herein are discussed only to provide a full and complete description of AgoraNet architecture and are not part of our inventions.

The present invention uses a "publish and subscribe" model, in which vendors may publish catalogs and information about a product and service offerings to AgoraNet applications hosted at a national site. Subscribing organizations are able to browse and search vendor data using a Global Naming Service as well as search engines, agents, queries and a subscription service. Buyers and Sellers may communicate directly using an integrated messaging system and a series of AgoraNet Documents defined herein.

Buyers may obtain quotations from Sellers and calculate the Total Landed (delivered) cost of goods prior to purchase. Buyers may place Blanket and standard Purchase Orders and track order shipments to destination. Sellers receive payment electronically for goods and services. Orders for goods and services may be translated to XML or EDI formats and transmitted directly to subscriber order processing systems or serve as input to standard or customized supply chain management applications hosted at Agora-Net sites using AgoraNet network for transport.

One objective of the present invention is to enable "any to any" business-to-business (buyer to seller) electronic commerce transactions between organizations worldwide using, for the first time, a networked computer architecture based on national deployment (i.e., physical, replicated deployment of the architecture at one or more processing sites in each country). AgoraNet is a networked system implemented on a national basis, (i.e., with at least one site located in each country and specifically designed to enable and facilitate electronic commerce transactions between organizations located in these different countries).

AgoraNet sites may be directly connected in a "point-to-point" or "mesh" network over which data is replicated and transmitted. This functionality includes enabling a Buyer, who may be previously unknown to Seller, to locate desired goods and services, obtain pricing, shipping and credit information, and to place orders which are transmitted either directly to Seller or a supply chain application hosted on an AgoraNet site for order processing and fulfillment.

Another objective of the present invention is to provide a secure, reliable and upgradeable worldwide network for business to business electronic commerce without using the Internet or Internet services such as the World Wide Web for backbone or electronic funds transfer services. The sole exception to this rule may be the Transmission Control Protocol/Internet Protocol (TCP/IP) specified for network addressing and communications. AgoraNet may support multiple communications links including the Internet for access to AgoraNet sites. However, AgoraNet architecture does not utilize the Internet for backbone, inter-site communications or electronic funds transfer. Rather, secure, redundant links are maintained between AgoraNet sites.

Another objective of the present invention is to implement the first uniform, extensible system for procurement of goods and services by national and local governments. A national procurement system allows government agencies to publish requests for proposals and receive responses electronically from vendors. This system may enable both internal (government agency) and external (third party) auditing of transactions to eliminate the possibility of illegal practices. This system allows government agencies to search vendor catalogs published on the system and to engage in a full range of purchasing activities.

Another objective of the present invention is to provide subscribers with integrated order processing-supply chain management by allowing orders generated by AgoraNet Worldwide Virtual Open Trade Extranet to be input to standard supply chain management software hosted at AgoraNet sites, enabling subscriber supply chain operations to use AgoraNet architecture including electronic payment systems to complete the order processing cycle.

Another objective of the present invention is to implement the first worldwide implementation of the Distributed Computing Environment Global Directory Service, a global name service based on the ISO 9594 standard which supports both the X.500 and Internet DNS name services. It is a hierarchical service capable of unambiguously resolving queries for the names of resources such as organizations worldwide.

Another objective of the present invention is to expedite and reduce the cost of importing and exporting by providing data from AgoraNet to the United States Government Customs Service systems as well as the Customs Services of each country in which it is deployed.

Another objective of the present invention is to facilitate business-to-business electronic commerce for subscribers by reducing the number of data errors created when multiple systems are used.

Another objective of the present invention is enable support for emerging United States and international laws governing electronic commerce models by incorporating them into AgoraNet documents.

AgoraNet may be deployed in a country with or without a formal, contracted relationship or agreement with national, regional and local governments of a country. AgoraNet is designed to be independent of the Internet and to have redundant links between national sites. AgoraNet utilizes software commonly known as "middleware" to provide a common set of standard services for the networked architecture. The middleware deployed comprises an implementation of the Distributed Computing Environment (DCE) including all core DCE services.

AgoraNet has two "core applications". These are "Virtual Open Trading Extranet" and "National Procurement and Resource Management". Each application may be accessed and made available independent of the others except each is hosted solely on AgoraNet and may share subscriber catalog data published to AgoraNet systems by another application. The Virtual Open Trading Extranet and National Procurement and Resource Management applications may utilize a universal catalog for goods and products.

The "Virtual Open Trading Extranet" is a networked publish and subscribe AgoraNet application.

Exporters, manufacturers, distributors and brokers subscribe to the application in respective countries and publish product information to sets of database catalogs on the system which use universal database structures. Using database replication techniques the system serves as a worldwide distributed database containing all of the vendor catalog data. Importers and Buyers subscribe to the system to search for goods and services using country of origin, standard classification codes, product characteristics, agents and search engines.

Having located desired goods and services offered by a specific vendor, buyers may request specific quotations, apply to establish a customer account, obtain credit and engage in the full range of purchasing activities. Sellers receive payment electronically. The Virtual Open Trading Extranet, like all AgoraNet applications, operates using a unique distributed computing architecture in which one or more AgoraNet sites in each country communicate directly with AgoraNet sites in other countries.

The "National Procurement and Resource Management" application is an AgoraNet publish and subscribe system to which national and local governments may publish requests for proposals, bid information, and the like. Vendors subscribe to the system and respond with proposals and bids. Payment for goods and services may be made electronically. Internal and third party auditing functions ensure the integrity of all transactions.

BRIEF DESCRIPTION OF THE DRAWINGS

The novel and non-obvious characteristics and nature of the invention are set forth in the appended claims. The operation of the invention is best understood by reference to the detailed description of specific embodiments which follow, when reviewed in conjunction with the accompanying drawings, wherein:

FIG. 2 provides a definition of the structure of all the data contained by AgoraNet Universal E-Commerce Product Catalog.

DETAILED DESCRIPTION OF THE INVENTION

The present invention provides a distributed computing architecture (hereinafter referred to as AgoraNet) based on national deployment (i.e., having sites located in each participating country and executing algorithms only on servers at each national site utilizing the rules, laws, trading partner agreements and tariffs governing electronic commerce transactions). The AgoraNet backbone consists of a mesh pattern network with dedicated redundant communication links between sites. The AgoraNet backbone is not necessarily connected to the Internet. However, web-based subscriber clients may use the Internet to connect to an AgoraNet site in their country. Subscriber clients may also use a Microsoft® Windows™ client computers to connect to the AgoraNet using a public or private circuit.

Figure 1:
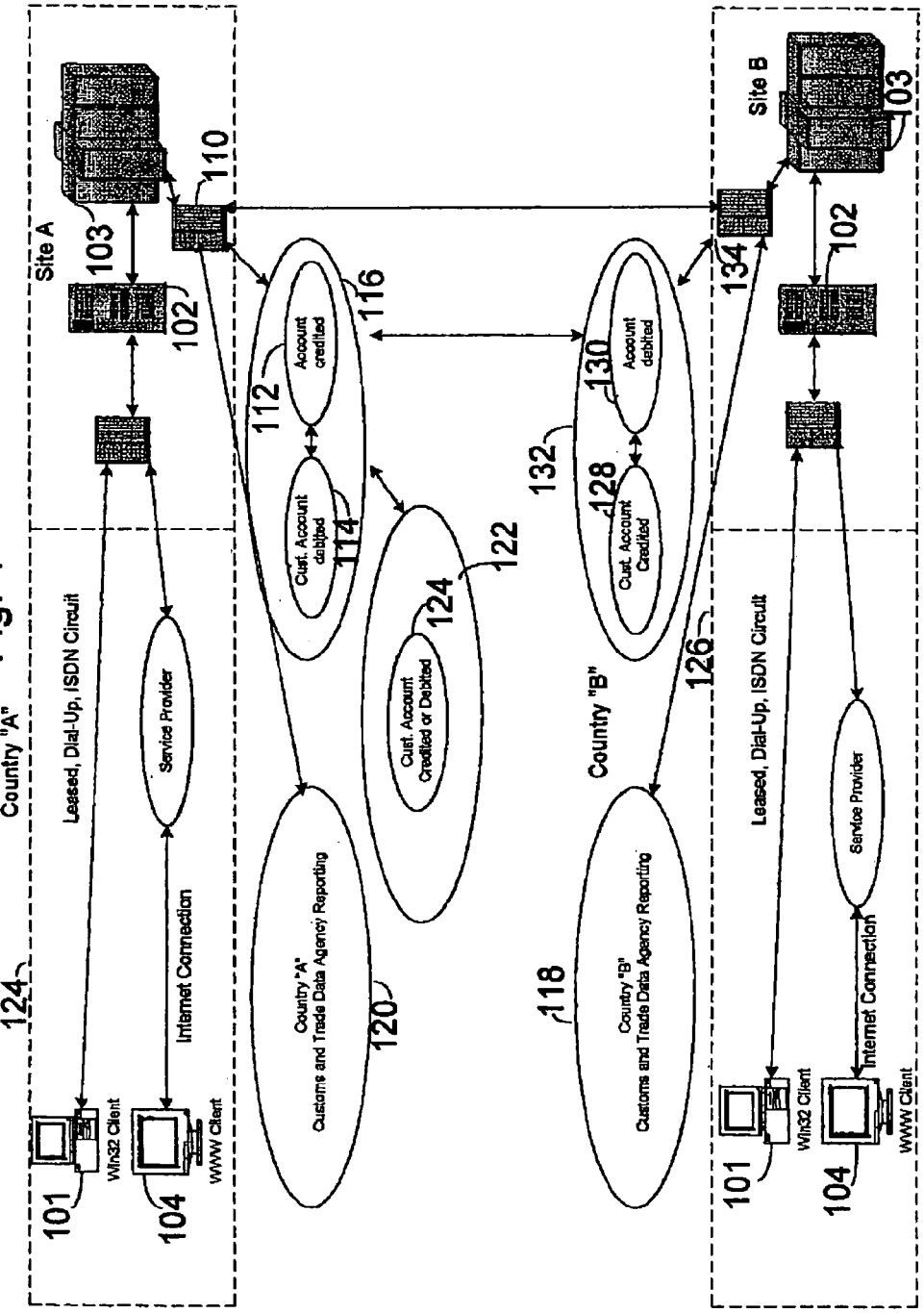
FIG. 1 is a top-level diagram depicting the logical three-tier architecture deployed in two national sites with nodes, backbone, subscriber connections, links to Government Agencies and electronic funds transfer.

Referring now to FIG. 1, there is shown a top-level functional block diagram illustrating a logical three-tier architecture deployed in two national sites with nodes, backbone, subscriber connections, links to Government Agencies and electronic funds transfer.

Each national site has one or more web browser clients 104 and/or Microsoft® Windows™ clients 101 connected to an application web server 102 through an internet service provide (ISP), leased line, dial-up, ISDN or other public or private circuit as well as routers, bridges switches and the like. Web server 102 may comprise multiple servers networked together. Application server 102 is similarly connected to a mainframe-class data server 103.

National site A 124 (in this example, a buyer site) may be connected to national site B 126 (in this example, a seller site) through a redundant backbone between routers, bridges, switches or the like 110 and 134 at national site A and B respectively. Router 110 also connects to buyer bank 116 and international trade data system (ITDS) 120. Buyer bank 116 may connect to seller bank 132 through a Society for Worldwide Interbank Financial Telecommunications (SWIFT) network and to another bank 122 (e.g., Wells Fargo) to process a Fedwire credit or debit. Buyer bank 116 may maintain customer account debit information 114 and seller bank 132 account credit information 112.

Router 134 may connect to a seller bank 132 and customs and trade data agency 118. Seller bank 132 may maintain customer account credit information 128 and buyer bank 116 account debit information 130.

Country specific business logic such as tariffs and trading bloc rules may be executed in computer code on application servers 102 and data servers 102. Internet web based clients 104 may connect to web server 102 at the national site, which uses a common gateway interface (CGI) script or similar method to translate requests to structured query language (SQL) queries and statements.

Data servers 103 may maintain object-oriented database tables containing all of the vendor, buyer and catalog data. Database replication techniques my be used to ensure transaction and distributed database integrity between national sites A and B 124 and 126 respectively. Data servers 103 may perform data translation to EDI and XML formats when necessary. The database may be object-relational, (e.g., Oracle8i Enterprise Edition or its successor).

Distributed Computing Environment Security Service may be used to authenticate subscribers and connections, provide authorization to applications and protect transmitted data. Both the web browser and Microsoft® Windows™ clients may be Distributed Computing Environment (DCE) clients. One authentication configuration is single sign-on, in which a subscribing user logs in to a DCE security server (which may reside on the application/web servers 102, data servers 103 or a separate server not shown) and may subsequently access all authorized applications without the need for additional logins. As previously stated in the Background section, the DCE services may be included and discussed to provide a complete and full description of the AgoraNet architecture.

In an authorization configuration for personal computer-based (workstation class) clients, subscribing users register in one or more groups which enjoy varying access privileges based on DCE access control lists (ACLs). ACLs contain lists of entries describing the explicit access permissions granted to users and groups.

IP Security (IPsec) may be used for encryption and data integrity of data transmitted across the AgoraNet backbone.

Web browser-based (web-based browser, web browser or www browser) clients may employ an authentication browser plug-in and session manager module to receive credentials for a DCE transaction from an AgoraNet DCE web server. Secure Sockets Layer (SSL) may be used to encrypt transaction data between the browser client and AgoraNet server.

DCE Cell Directory Service (CDS) provides location independence for named resources such as networked application servers. CDS enables resources to be accessed transparently without knowing where they reside. CDS may be used to replicate name service directories on at least one Cell Directory Server in each DCE cell such that access to application and data servers will be transparent and redundant.

The Global Directory Agent (GDA), a component of the Cell Directory Server, may be used to resolve resource names in DCE cells supporting the X.500 name service, DNS or both.

A DCE configuration for both browser-class and workstation-class clients is to login to an AgoraNet DCE-based security server in the CDS namespace where all configuration information is stored.

Remote access, such as dial-up access, may be provided to AgoraNet applications from AgoraNet Microsoft® Windows™ and web based browser clients that support the Point-to-Point Protocol (PPP).

AgoraNet may synchronize worldwide network time by using DCE Network Time Protocol and Distributed Time Service as well as by externally referencing time providers.

AgoraNet may use DCE capability of naming the entities within the worldwide distributed computing environment including users, groups, applications and resources. The individual identity of a user or resource within the CDS (cell) namespace is preserved when accessed from other cells as the user/resource name is qualified with the name of the cell in which it is registered.

AgoraNet may employ the DCE single logical database of user information worldwide called the registry service, which manages user passwords and enforces security policies. The registry service may assign a Unique Universal Identifier (UUID) to each user and process. A query of the UUID may identify the process or user and may return the user or process fully qualified name.

AgoraNet may provide two core applications to subscribing organizations: the Virtual Open Trade Extranet (VOTE) and National Procurement and Resource Management (NPR). VOTE is offered to commercial organizations and both government agencies and commercial organizations may utilize NPR.

VOTE is an application which may enable any subscribing buyer to engage in a full range of purchasing activities for any product or service published on the AgoraNet system worldwide in an electronic catalog by sellers, brokers, exporters or manufacturers, even if previously unknown to the seller. This is referred to as "any-to-any" electronic commerce (e-commerce). A Universal e-commerce Product Catalog is defined herein to enable "any-to-any" electronic commerce. Sellers, brokers, manufacturers or exporters who publish their product or service catalogs on the AgoraNet may restrict the viewing of part or all of the catalog contents to subscribing buyers based on variables including the country of origin of the buyer.

Figure 2:
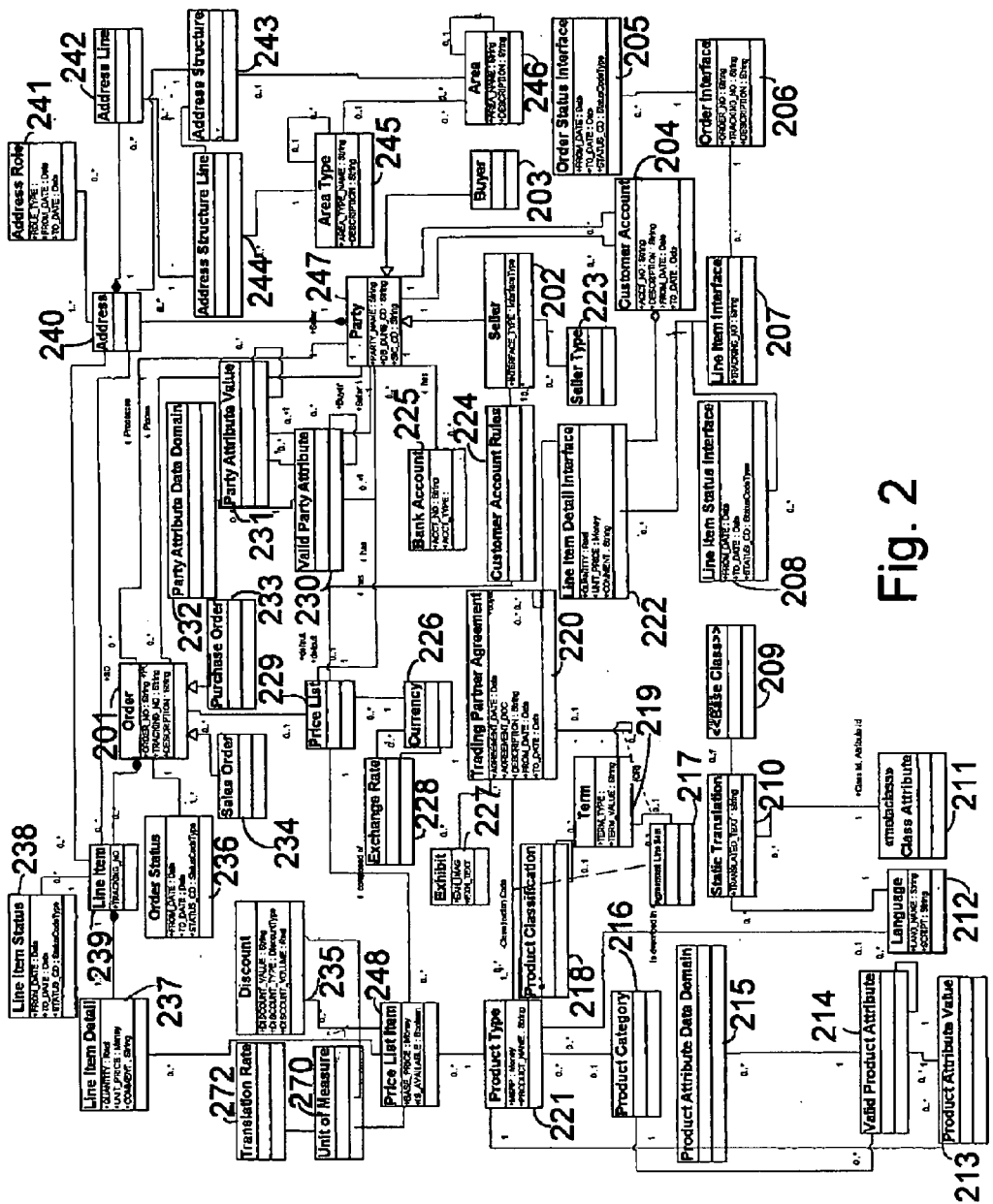
FIG. 2 is a UML (Unified Modeling Language) diagram of the high-level data model constructed to support the following functions of the Universal E-Commerce Catalog: Order Management, Universal Address Structure, External Interfaces, Extensible Product Attributes and Price Lists, Buyer and Seller Preferences and Multilingual Support.

FIG. 2 is a unified modeling language (UML) class diagram illustrating the high-level data model of the Universal E-Commerce Product Catalog. UML diagrams may be used to model complex software systems. UML class diagrams may generally be used to model object oriented software systems by graphically illustrating object classes and their relationships. UML is a fairly new modeling language, but there is an abundance of published material describing the language.

The data structures of the Universal E-Commerce Product Catalog support the following functions and features: Order Management, Universal Address Structure, External Interfaces, Extensible Product Attributes and Price Lists, Buyer and Seller Preferences and Multilingual Support. FIGS. 3-8 are UML class diagrams illustrating functionally separate portions of the high-level data model illustrated in FIG. 2.

The following is the definition of each class illustrated in the Figures.

Address class 240 describes a valid address for an organization location. It is possible that an organization has more than one address (instances of Address class 240). Each address class instance may have one or more addresses in Address Role class 241 (such as Billing, Shipping, Mailing, Contact Address, etc.). Address class 240 may have different instances of Address Structure class 243 depending on the country where the organization is located. Depending on Address Structure class 243 the Address class 240 may have a different number of instances of Address Line class 242 associated with it.

For example, XYZ Inc. is a book distributor having two warehouses (one in Connecticut, another one in Vermont). Its headquarters is located in New York City. Three physical addresses (instances of Address class 240) are associated with it. Therefore, there are three instances of Address class 240. Products may be shipped from each of its two warehouses, so the headquarters address instance of Address Class 240 has both a Billing and Mailing instance of Address Role class 241.

Address Line class 242 is part of Address class 240. Each address line class 242 is associated with Address Structure Line class 244 of Address Structure class 243 which is associated with address class 240.

For example, XYZ Inc. is located in the U.S. The U.S. address structure (an instance of Address Structure class 243) has the following instances of Address Structure Line class 244: Street, City, State, and Zip. Therefore there are four instances of address line classes 242 for XYZ Inc. address class 240, e.g., 875 Spring St. #122 corresponds to the "street" address structure line (an instance of Address Structure Line class 242).

Address Role class 241 defines the purpose for an address (an instance of address Class 240). Each address class may play multiple address roles in address role class 241. For example, XYZ Inc. is a book distributor having two warehouses, one in Connecticut and one in Vermont. Its headquarters is located in New York City. There are three physical addresses. Products may be shipped from each of its two warehouses. The headquarters address plays both Billing and Mailing address roles (instances of Address Role class 241). Warehouse addresses (an instance of Address class 240) play only a Shipping address role.

Address Structure class 243 incorporates a set of address structure lines (an instance of Address Structure Line class 244) defined so that the set of components conforms to the address of a particular high level area, e.g., country, (an instance of Area Class 246). For example, an address structure for the U.S. (an instance of Address Structure class 243) has four address structure lines (instances of Address Structure Line class 244), for example, street, city, state and zip code.

Address Structure Line class 243 is the finest component of the particular Address Structure Class 240. For example, an address structure for the United States (an instance of Address Structure class 243) has four address structure lines (instances of Address Structure class 244), for example, city, state, and zip code.

Agreement Line Item class 217 contains line items of a trading partner agreement (an instance of Trading Partner Agreement class 220). Agreement line items (instances of Agreement Line Item class 217) define agreement conditions that are specific for particular product types (instances of Product Type class 221). If the agreement line item defines a price for the particular product, it overrides the corresponding default price in a price list (an instance of Price List class 229). Trading partner agreement class 220 may have terms (instances of Term Class 219) and exhibits (instances of Exhibit class 227) associated with it.

For example, a trading partner agreement (an instance of Trading Partner Agreement class 220) has an agreement line item (an instance of Trading Partner Agreement Line Item class 217) of "Apache Server Handbook" product type (an instance of Product Type class 221) defining the unit price for this product type to be ten Dollars rather than fifteen Dollars as defined as the default price (an instance of Price List Item class 229).

Area class 246 describes a geographical unit and is associated with Area Type class 245. There is a hierarchy of the areas in area class 246 in the system. For example, Suppose AgoraNet contains the following areas (instances of Area class 246): United States, France, Spain, Italy, Manhattan, Rome, Paris, and Barcelona. The following area hierarchies will exist in the system in this case: United States→New York→Manhattan; France→Paris; Italy→Rome; Spain→Barcelona.

Area Type class 245 describes the type of an area (an instance of Area class 246). There is a hierarchy of area types (instances of Area Type class 245) in the system. Each area preferably belongs to one of the instances of area type class 245. For example, the following is an area hierarchies of area types (instances of Area Type class 245) in the system: Country→State→City and Country→City.

Bank Account class 225 defines a bank account of a party (an instance of Party class 247). It has an account number (global ACCT_NO object) which is an actual account number and account type attributes described in a global ACCT_TYPE object as shown in Bank Account class 225. Account Type may define the category of the account (i.e., credit, debit etc).

For example, Party XYZ Inc. has two bank accounts. Therefore, there are two instances of Bank Account class 225. The first bank account class instance is a Credit Account having an Account Number of 1234567XXX25, and the second bank account class instance is a Debit Account having an Account Number equal to 1234567XXX26.

Buyer class 203 is a specialization of a party (an instance of Party class 247) and thus contains attributes and associations specific to the role of a buyer (an instance of Buyer class 203). For example, XYZ Inc. is a book distributor.

When it buys product from vendors or from other resellers it plays the role of a buyer (an instance of Buyer class 203).

Class Attribute class 211 defines class names and their text attributes that may have a static translation (an instance of Static Translation class 210). For example, global PRODUCT_NAME object shown in Product Type class 221 is an attribute of the Product Type class.

Currency class 226 defines currencies supported by the AgoraNet. Sellers (instances of Seller class 202) assign currency values (instances of Currency class 226) to their price list (instance of Price List class 229). Exchange Rate between currencies is defined by an Exchange Rate class 228. For example, currencies (instances of Currency class 226) may be U.S. Dollar, Italian Lira and Brazilian Real.

Customer Account class 204 describes relationships between parties from Party class 247, e.g., a buyer and seller (instances of Buyer and Seller classes 203 and 202 respectively). If a seller establishes a customer account (an instance of Customer Account class 204) for its customer, the customer has the right to place orders with this particular seller. The default price list (an instance of Price List class 229) may be assigned to the customer account (an instance of Customer Account class 204).

Prices indicated in a trading partner agreement (an instance of Trading Partner Agreement class 220) may override prices from the price list. For example, XYZ Inc. has opened customer account #12345ZZZ45 (an instance of Customer Account class 204) for the ZZZ Inc. party (an instance of Party class 247). The account is associated with price list #P12345 (an instance of Price List class 229) as well as a trading partner agreement (an instance of Trading Partner Agreement class 220).

Customer Account Rules class 224 defines rules for opening a customer account (an instance of Customer Account class 204). Each seller (an instance of Seller class 202) may have a different set of rules. For example, one customer account rule (an instance of Customer Account Rules class 224) associated with XYZ Inc. party (an instance of Party class 247) indicates the customer may require a Credit Rating greater than 75.

Discount class 235 indicates adjustment to prices (an instance of Price List Item class 248) of a specific product type (an instance of Product Type class 221) that is applied to the price listed in a price list (an instance of Price List class 229) if specific conditions are met. For example, if buyer XXX Inc. (an instance of Buyer class 203) orders more than 1000 items of Apache Server Handbook from XYZ Inc. then it will receive a 5% discount (a instance of Discount class 235). However, if XXX Inc. orders the same items from ZZZ Inc. then it will receive a 10% discount (another instance of Discount class 235).

Exhibit class 227 describes agreement clauses regarding trading partner agreements (instances of Trading Partner Agreement class 220). For example, a trading partner agreement (an instance of Trading Partner Agreement class 220) may specify payment within 30 days indicated in an exhibit (an instance of Exhibit class 227).

Exchange Rate class 228 defines the rate of exchange between different currencies (an instance of Currency class 226). The Exchange Rate class retains historic information since the entire transaction may not happen at the same time (e.g., items may be shipped prior to billing). For example, an exchange rate of one U.S. Dollar=1.03687 Euros on Feb. 29, 2000 would be one instance of Exchange Rate class 228.

Language class 212 defines human languages supported by the AgoraNet. For example, English, Spanish and French languages are supported by AgoraNet, so they are instances of Language class 212.

Line Item class 239 is part of Order class 201 and contains line items of an order (an instance of Order class 201). Line Item class 239 logically groups line item details (an instance of Line Item Detail class 237) of an order. Line Item class 239 incorporates a set of line item details identifying items to be shipped from a single seller site to a single buyer site in the same shipment.

For example, XYZ Inc. has one warehouses located in Connecticut and another one in Vermont. Buyer ZZZ Corp. has placed an order with XYZ Inc. for 100 copies of "Supply Chain Management Guide" and 50 copies of "Apache Server Administrator's Handbook" product types (an instance of Product Type class 221) to be shipped to a bookstore located in New York. An additional 50 copies of "Apache Server Administrator's Handbook" product type are to be shipped to a bookstore in New Jersey. If all the books are stored in the same warehouse there will be two line items (instances of Line Item class 239): one that is shipped to New York with items of two different product types, and another shipment to New Jersey. In the event that the copies of the "Supply Chain Management Guide" are stored in the Vermont warehouse and the copies of the "Apache Server Administrator's Handbook" are located in Connecticut there will be three shipments and three corresponding line items, i.e., three corresponding instances of Line Item class 239 in the order.

Line Item Detail class 237 describes the smallest components comprising an order (an instance of Order class 201). It shows individual product types (instances of Product Type class 221) that were purchased. One instance of Line Item Detail class 237 is line item detail for items of the same product type (an instance of Product Type class 221) that are contained in the same shipment. There can be any number of instances of Line Item detail class 237 associated with a line item (an instance of Line Item class 239).

Looking at the prior example, when the order consisted of two line items (two instances of Line Item class 239), the first line item consisted of two line item details (two instances of Line Item Detail class 237), where the first line item detail indicated 100 copies of "Supply Chain Management Guide" product type were ordered and the second indicated 50 copies of "Apache Server Administrator's Handbook" product type were ordered.

Line Item Detail Interface class 222 stores temporary line item details (an instance of Line Item Detail class 237) for an order (an instance of Order class 201) that have been downloaded from the AgoraNet system to an external system or that have been uploaded from an external system to the AgoraNet system. Refer to the example for Line Item Detail class 237 for an example of Line Item Detail Interface class 222.

Line Item Interface class 207 stores temporary line items (instances of Line Item class 239) for orders that are either downloaded from the AgoraNet system to an external system or that are uploaded from an external system to the AgoraNet system. For an example refer to the example for the Line Item class.

Line Item Status class 238 describes the status of line items (instances of Line Item class 239). Line Item Status class 238 contains all of the history information about line item status changes. "In Transit", "Cancelled" and "Completed" are instances of Line Item Status class 238.

Line Item Status Interface class 208 provides temporary storage for instances of Line Item class 239 for orders (instances of Order class 201) which may either be downloaded from the AgoraNet system to an external system or uploaded from an external system to the AgoraNet system. For an example refer to the example for Line Item class 239.

Order class 201 describes orders by which instances of Party class 247 buy and sell their products. It may comprise instances of Line Item class 239 which may be decomposed to instances of Line Item Detail class 237.

For example, XYZ Inc. has one warehouse located in Connecticut and another located in Vermont. A buyer ZZZ Corp. has placed an order (an instance of Order class 201) with XYZ Inc. for 100 copies of "Supply Chain Management Guide" product type along with 50 copies of "Apache Server Administrator's Handbook" product type which may need to be shipped to a bookstore located in New York. An additional 50 copies of "Apache Server Administrator's Handbook" may need to be shipped to a bookstore in New Jersey.

If all the books are stored in the same warehouse there will be two instances of Line Item class 239, one indicating shipment to New York with items of two instances of Product Type class 221, and another shipment to New Jersey. In the event that the copies of the "Supply Chain Management Guide" are stored in the Vermont warehouse and the copies of the "Apache Server Administrator's Handbook" are located in Connecticut there will be three shipments and three corresponding instances of Line Item class 239 in this order (an instance of Order class 201).

Order Interface class 206 describes temporary storage for instances of Order class 201 which may either be downloaded from the AgoraNet system to an external system or uploaded from an external system to the AgoraNet system. For an example refer to the example for Order class 201.

Order Status class 236 describes the status of an instance of Order class 201. Order status class 236 contains all of the historical information related to order status changes. An order cannot be completed until all of its instances of Line Item class 239 indicate a status of either "Completed" or "Cancelled". "In Transit", "Cancelled" and "Completed" are examples of instances of Order status class 236.

Order Status Interface class 205 provides temporary storage for instances of Order Status class 236 related to instances of Order class 201 which may either be downloaded from the AgoraNet system to an external system or uploaded from an external system to the AgoraNet system.

Party class 247 describes an actor using the AgoraNet system. For specific transactions it may play the role of either buyer or seller (i.e., its children are Buyer and Seller classes 203 and 202 respectively). Party class 247 has one or more instances of Address class 240 and one or more instances of Bank Account class 225. As a seller it may open accounts for its customers and process buyer orders. As a buyer it may request a seller to open an account for it, or it may place the order with a particular seller.

For example, XYZ Inc. may be a Book Distributor. An instance of Party class 247 may be either or both seller and buyer roles.

Party Attribute Data Domain class 232 describes the domain of values a custom attribute of an instance of Party class 247 may assume. For an example refer to the example for Product Attribute Data Domain class 215.

Party Attribute Value class 231 describes values of a custom attribute of an instance of Party class 247. For an example refer to the example for Product Attribute Value class 213.

Price List class 229 defines a set of instances of Product Type class 221 which a seller (an instance of Seller class 202) may provide and has instances of Price List Item class 248 having price and availability information. Each instance of Price List class 229 may have several instances of the Price List Item class which define prices for specific products. A seller may have several instances of Price List class 229. Each instance of the Price List class may be related to only one seller (an instance of the Seller class). When a customer opens an account with seller the default instance of Price List class 229 may be assigned to that instance of Customer Account class 204. The prices (instances of Price List Item class 248) from an instance of Price List class 229 may be overridden by prices associated with an instance of Trading Partner Agreement class 220.

For example, XYZ Inc. has two instances of Price List class 229 for customers of different categories. The first instance may be intended for its frequent and most reliable trading partners and the second one may be for occasional customers.

Price List Item class 248 defines prices for instances of Product Type class 221 for a particular instance of Price List class 229. For example, XXX Inc. has an instance of Product Type class "Apache Server Handbook" in its instance of Price List class 229. For example, Price List Item class 248 defines the unit price for a particular instance of Product Type class 221 as 15 Dollars.

Product Attribute Data Domain class 215 defines the domain of values a custom attribute of an instance of Product Type class 221 may assume. For example, a "Book" instance of Product Type class 221 has a "Cover Type" instance of Valid Product Attribute class 214. The instance of Product Attribute Data Domain class 215 for this attribute contains "Hardcover" and "Paperback" values.

Product Attribute Value class 213 may be a value of a custom attribute of an instance of Product Type class 221. For example, an instance of Product Attribute Value class 213 for a "Cover Type" attribute of the "Apache Server Administrator's Handbook" instance of Product Type class 221 has a "Paperback" value.

Product Category class 216 groups together instances of Valid Product Attribute class 214 which describe an instance of Product Type class 221 for a particular instance of Product Category class 216. For example, Book, CD, PC and Furniture are examples of instances of Product Category class 216.

Product Classification class 218 may be a standard product classification hierarchy and a set of corresponding Classification Codes. North American Industry Classification System (NAICS) is an example of an instance of Product Classification class 218.

Product Type class 221 defines an instance of Product Type class 221 which may be bought or sold through the AgoraNet system. Product Type class 221 exists in an instance of Product Category class 216, has an instance of Unit of Measurement class 270 and may have custom attributes for an instance of Product Type class 221. For example, an "Apache Server Handbook" may be a "Book" instance of Product Category class 216 has "ISBN" as a custom attribute for an instance of Product Type class 221 and 0-7645-3306-1 for an instance of Product Attribute Value class 213.

Purchase Order class 233 may be a specialization of Order class 201, (i.e., it may be a child of Order class 201). Purchase Order class 233 defines a set of instances of Order class 201 attributes making sense for a buyer.

Sales Order class 234 may be a specialization of Order class 201 (i.e., it may be a child of Order class 201). Sales Order class 234 defines a set of instances of Order class 201 attributes making sense for a seller.

Seller class 202 may be a specialization of an instance of Party class 247 and contains seller specific attributes. One or more instances of Seller Type class 223 may categorize instances of Seller class 202. Seller class 202 may define instances of Customer Account Rule class 224 for opening accounts for its customers, e.g., an instance of Buyer class 203. For example, XYZ Inc. may be a book distributor selling its products to other resellers, bookstores etc. Therefore, XYZ Inc may be an instance of Seller class 202.

Seller Type class 223 may be the category of instances of Seller class 202. Seller Type class 223 may be a Manufacturer, Distributor etc. Seller Type class 223 stores attributes specific to each category. An instance of Seller class 202 may be one or more instances of Seller Type class 223. For example, XYZ Inc. may be a distributor type instance of Seller Type class 223. Usually it buys books from manufacturers and resells them to reseller type instances of Party class 247.

Static Translation class 210 describes the value of particular text attributes along with the language the text may be written in. To translate the value of the attribute to another language it may be necessary to find the instance of Static Translation class 210 of the attribute associated with the desired language.

Term class 219 defines valid terms of an instance of Trading Partner Agreement class 220 with their effective dates. Instances of Term class 219 may include clauses for renewals, agreement termination, indemnification, non-competition and provisions for exclusive relationships. Instances of Term class 219 may be associated either with Trading Partner Agreement class 220 as a whole or with specific instances of Agreement Line Item class 217.

For example, an instance of Trading Partner Agreement class 220 has an instance of Agreement Line Item class 217 associated with an "Apache Server Handbook" instance of Product Type class 221. There may be an instance of Term class 219 of type "NotGreaterThan" with value equal 10000 which defines the maximum quantity of items of the given instance of Product Type class 221 in one order (one instance of Order class 201).

Trading Partner Agreement class 220 describes a trading agreement between instances of Party class 247 which may be concluded when an instance of Customer Account class 204 may be initialized or opened or at any time thereafter. Trading Partner Agreement class 220 defines terms and conditions of the buying and selling of products, goods or services. Instances of Term class 219 (trading partner agreement terms) may be changed after one may be established. It may have a Starting Date (global FROM_DATE object) and an Ending Date (global TO_DATE object) as well.

Trading Partner Agreement class 220 defines additional conditions that instances of Party class 247 have agreed on and it may have associated instances of Agreement Line Item class which define conditions for specific instances of Product Type class 221. If an instance of Agreement Line Item class 217 contains prices for a particular product, these override default prices in the instance of the Price List class. An instance of Trading Partner Agreement class 220 may have instances of Term class 219 and Exhibit class 227 associated with it.

For example, XYZ Inc. may be a book distributor having a trading partner agreement with ZZZ Inc. (an instance of Trading Partner Agreement class 220). The trading partner agreement has line items (instances of Agreement Line Item class 217), term (an instance of Term class 219) and exhibits (an instance of Exhibit class 227). The agreement line items define specific prices for certain products, and the terms define additional constraints and conditions which determine when these prices may be applied.

Translation Rate class 272 describes the translation between alternative instances of Units of Measurement class 270 and may be generally the ratio between values of the same amount of a particular instance of Product Type class 221 measured in units. For example, the translation of 1 inch to 1 meter may be as follows: 1 Inch/1 Meter=0.0254.

Unit Of Measure class 270 defines the unit of measurement for instances of Product Type class 221. It may be a quantity attribute of the Product Type class which may be related to the unit of measure. Examples of instances of Unit of Measure class 270 are bushel and pound.

Valid Party Attribute class 230 describes valid party attributes within the AgoraNet system. For an example see the example for Valid Product Attribute class 214.

Valid Product Attribute class 214 defines the custom attributes of an instance of Product Type class 221. An instance of a Valid Product Attribute class for a "Book" instance of Product Category 216 are Author, Publisher, Year, ISBN, Cover Type etc.

Figure 3:
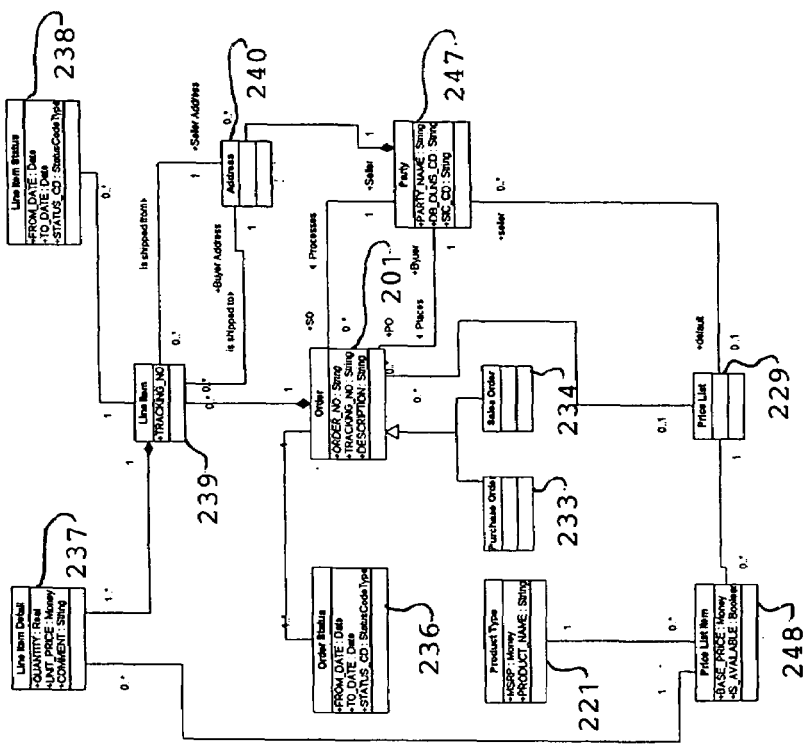
FIG. 3 is a UML diagram of the Order Management data structure of the Universal E-Commerce Product Catalog.

FIG. 3 is a UML class diagram illustrating the Order Management data structure of the universal e-commerce product catalog, i.e., the processes of placing and tracking each order.

As shown in FIG. 3, Party class 247 plays an important role in the processes of placing and tracking orders. Party class 247 is a general abstraction for an entity which takes part in the order process. Buyer class 203 and Seller class 202 may be types of Party class 247 (i.e., the Buyer and Seller classes are children of the Party class). Address class 240 may be part of the Party class (i.e., the description of each party includes address information).

Before placing an order, a buyer (an instance of Buyer class 203) chooses a party (an instance of Party class 247) they may be willing to deal with (in this example, a seller), they may then place an order (an instance of Order class 201) provided that they already have a customer account (an instance of Customer Account class 204) established with the seller (an instance of Seller class 202). A default price list (an instance of Price List class 229) may be assigned to the customer when the seller opens a customer account.

The parties involved may have a trading partner agreement (an instance of Trading Partner Agreement class 220) which defines some unique buying conditions and may include product prices different from the default prices in the price list the seller has assigned for a particular product type (an instance of Product Type class 221).

Orders may be either purchase orders (instances of Purchase Order class 233) or a sales orders (instances of Sales Order class 234), i.e., Purchase Order class 233 and Sales Order class 234 may be kinds of Order class 201. To place an order, the buyer selects products they want to buy from the product types the seller offers among their price list items (an instance of Price List Item class 248). The shipping addresses may be grouped by delivery location, e.g., address, further defining the price list items of the order. Finally, the buyer confirms that line item details (an instance of Line Item Detail class 237) of the order are populated, thereby verifying the order.

The price for each specific product may be a base price (global object in Price List Item class 248) established by the seller, and the base price may be discounted (an instance of Discount class 235). If a trading partner agreement exists between the parties, an agreement line item (an instance of Agreement Line Item class 217) may determine the price of the specific product.

After an order is posted to the system, the seller may either approve or discard the order. The finest level of granularity in terms of order approval or discard may be a line item (an instance of Line Item class 239). If the order is approved, the seller may begin to process it. The status of the order line items (an instance of Line Item Status class 238) may come to the AgoraNet system through external interfaces to the seller order processing system.

The status of the order (an instance of Order Status class 236) may depend on the line item status. The order is completed when all the line items have a status of "COMPLETED". The buyer may track the order status within the AgoraNet system through the use of a tracking number(s) (global object TRACKING_NO in Order class 201) provided by the seller to track orders through external systems.

Figure 4:
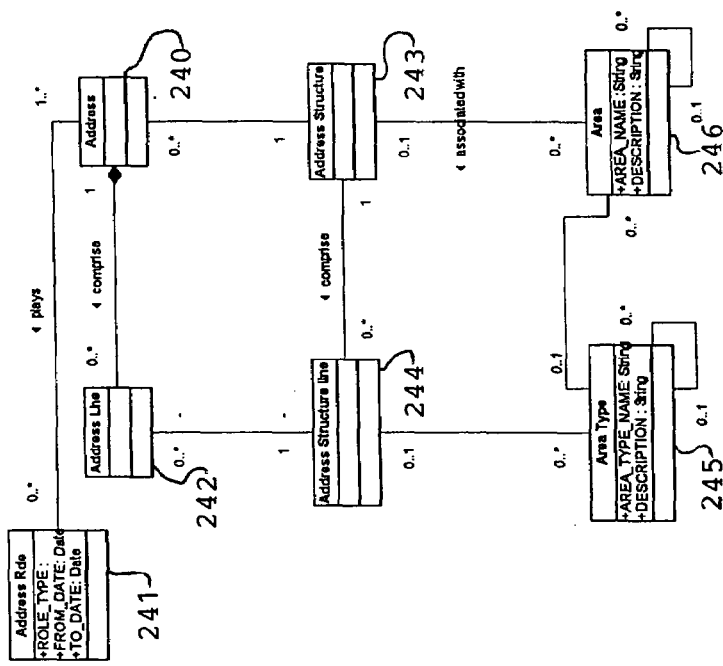
FIG. 4 is a UML diagram of the Universal Address data structure of the Universal E-Commerce Product Catalog.

FIG. 4 is a UML class diagram illustrating the universal address data structure of the universal e-commerce product catalog for managing address information of the parties involved in a transaction.

As shown in FIG. 4, an address (an instance of Address class 240) in each country may have a different address structure (an instance of Address Structure class 243) because various sites of each party may be located in different areas (an instance of Area class 246). Area type (e.g., country) may be described by Area Type class 245. A U.S. address is identified through a street, city, state and zip code line (instances of Address Structure Line class 244). The information on each address line may describe an Address Line class 242.

The address structure may be different in countries which do not have States. Therefore, a high level area which does not have a parent area ("Country" area type) may have an area structure associated with it having an address structure line of another area type (such as City Type, Street Type). The address of a party may have the address structure which is associated with the high level area (Country) where the party site is located. Each address may play a role (an instance of Address Role class 241), e.g., shipping address.

Figure 5:
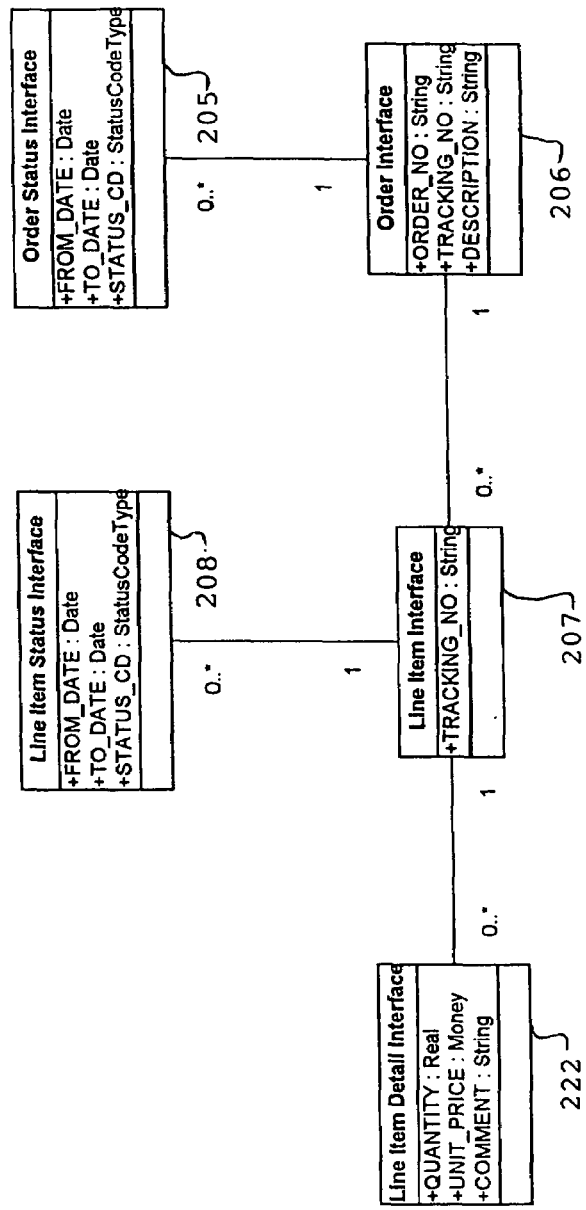
FIG. 5 is a UML diagram of the External Interfaces data structure of the Universal E-Commerce Product Catalog.

FIG. 5 is a UML class diagram illustrating external interfaces data structure of the universal e-commerce product catalog for exchanging order information between the AgoraNet system and external systems.

As shown in FIG. 5, the order structure as it exists in the system is replicated so that each class from the order data model has a corresponding interface class. The external interface data structure stores order information, thereby acting as a cache or buffer. Order class 201 is replicated as Order Interface class 206, and Line Item Class 239 is replicated as Line Item Interface class 207. Line Item Detail class 237 is replicated as Line Item Detail Interface class 222, and Order Status class 236 is replicated as Order Status Interface class 205. Line Item Status class 238 is replicated as Line Item Status Interface 208.

When order data is either downloaded from or uploaded to the AgoraNet system, these interface structures may have to be cleared out and then populated with the desired order data. In case the data is uploaded to the AgoraNet system from an external source, the application may populate interface tables with the order data of the external orders. Loaded data may be validated after uploading is completed.

The correct order information may then be used to ether insert new order(s) to the AgoraNet system or update existing order information. In case order information is downloaded from the AgoraNet system, the application may populate the interface tables with downloaded information (taking it from the order structure) and then depending on the external system requirements, to download the data in the file having the desired data format.

Figure 6:
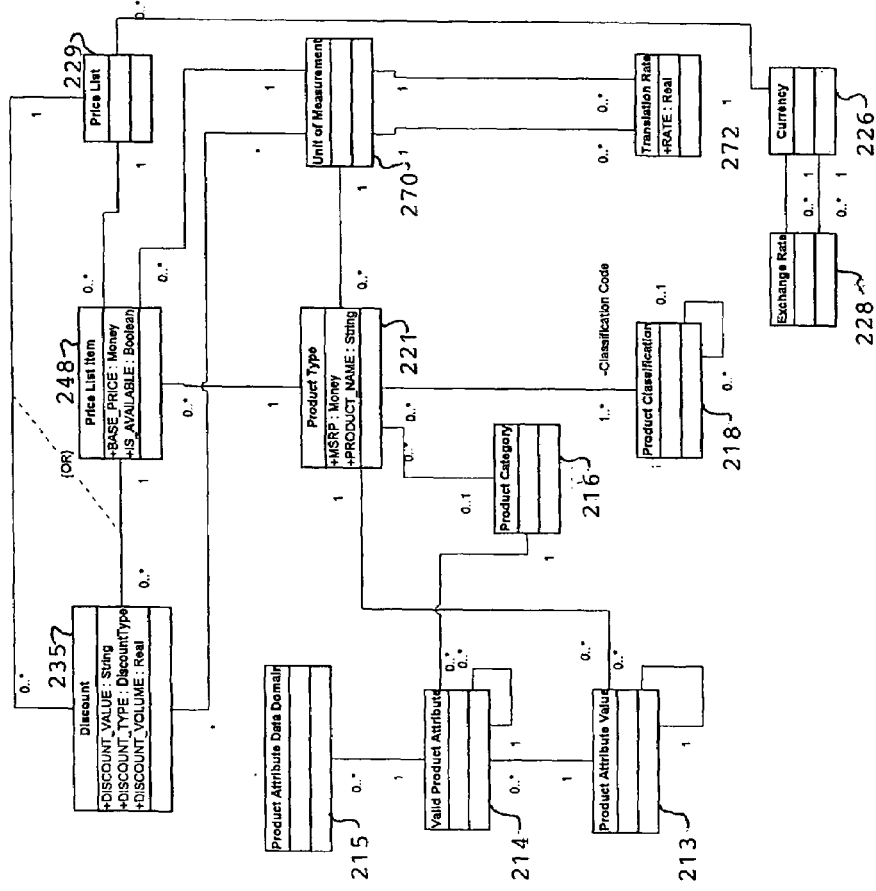
FIG. 6 is a UML diagram of the Product Attributes/Price List data structure of the Universal E-Commerce Product Catalog.

FIG. 6 is a UML class diagram illustrating the product attributes and price list data structure of the universal e-commerce product catalog for storing information about arbitrary products and services universally in the system.

As shown in FIG. 6, each product type (an instance of Product Type class 221) may be associated with a unit of measurement (an instance of Unit of Measurement class 270), and the units of measurement may have a translation rate (an instance of Translation Rate class 272) associated therewith to convert between units. One or more product classifications (instances of Product Classification class 218) may be associated with the product type. The product attributes model has an extensible structure making it possible to define new types of attributes for the product type if necessary. The set of custom attributes for the product type may be defined by the Product Category class 216 associated with it.

To create a non-standard product attribute, create a new valid product attribute (an instance of Valid Product Attribute class 214) defining an attribute name, data type and relationship with other attributes of this product if they exist and a product attribute data domain (an instance of Product Attribute Data Domain class 215) defining valid values of valid product attribute (an instance of Valid Product Attribute class 214). Subsequently, a product attribute value (an instance of Product Attribute Value class 213) may be assigned. When a seller publishes data about its products a check may be made to determine if another seller has already published information for this product type (an instance of Product Type class 221). If the information about the product type has not been published then a new product type may be created.

As soon as the new product type is created it may be defined as a price list item (an instance of Price List Item class 248) in any number of price lists (instances of Price List class 229) of different sellers. The price list item may have a discount (an instance of Discount class 235) associated with it. Additionally, the price list may have currency (an instance of Currency class 226) associated with it, and the currency may have an exchange rate (an instance of Exchange Rate class 228) associated therewith.

Figure 7:
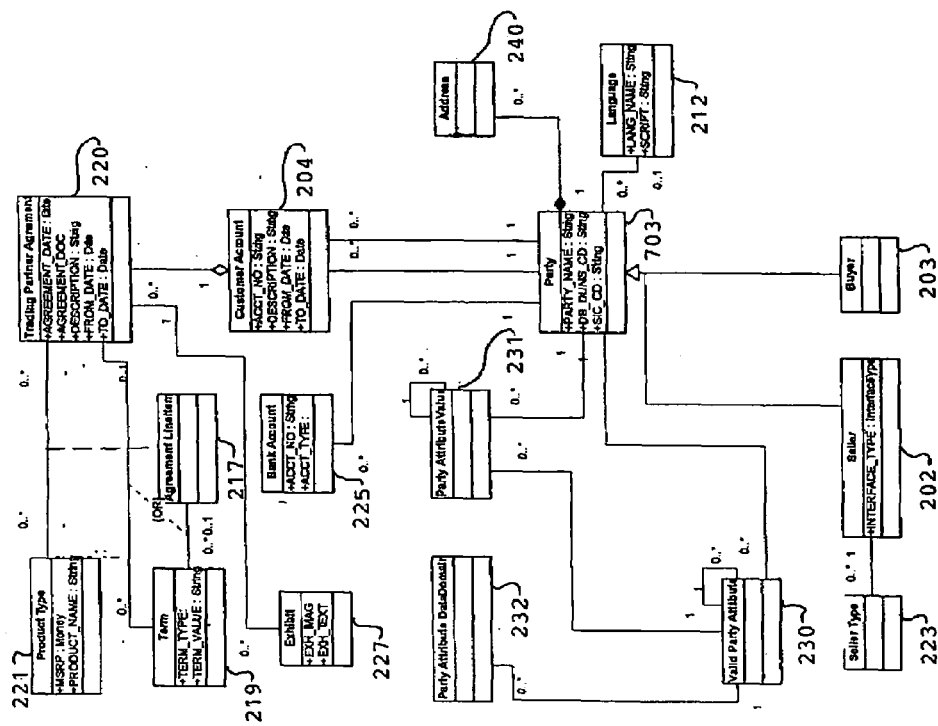
FIG. 7 is a UML diagram of the Buyer/Seller Preferences data structure of the Universal E-Commerce Product Catalog.

FIG. 7 is a UML class diagram illustrating a buyer and seller preferences data structure of the universal e-commerce product catalog.

As shown in FIG. 7, buyer (an instance of Buyer class 203) and seller (an instance of Seller class 202) preferences may define general party (an instance of Party class 247 for a seller or buyer) preferences such as bank account (an instance of Bank Account class 225) numbers (global ACCT_NO object shown in Bank Account class 225), SIC code (global SIC_CD object shown in Party class 247), seller type (an instance of Seller class 223), customer account rules (an instance of Customer Account Rules class 224) as well as specific preferences for either seller or buyer. Seller and buyer are the specializations of Party class 247 and may have their own attributes along with general party attributes.

Seller may open customer accounts (instances of Customer Account class 204) for its customers (buyers) which may play the role of the customer profile and may create trading partner agreements (instances of Trading Partner Agreement 220) which may define terms (an instance of Term class 219) or conditions (instances of Agreement Line Item class 217) of the trading agreement between the seller and buyer. These preferences may be used later during the Order Management process as discussed above. Trading partner agreements may have product types (instances of Product Type class 221) and exhibits (instances of Exhibit class 227) associated with them as well. Buyers may be categorized by the Buyer class 712.

New attributes for the party may be created by creating a valid party attribute (an instance of Valid Party Attribute class 230) which may define the attribute Name, Data Type and relationship with other attributes for the party if required for each non-standard PARTY attribute. A party attribute data domain (an instance of Party Attribute Data Domain class 232) defining valid values for the valid party attribute may additionally be defined. Subsequently, a party attribute value (an instance of Party Attribute Value class 231) may be assigned to the attribute.

Figure 8:
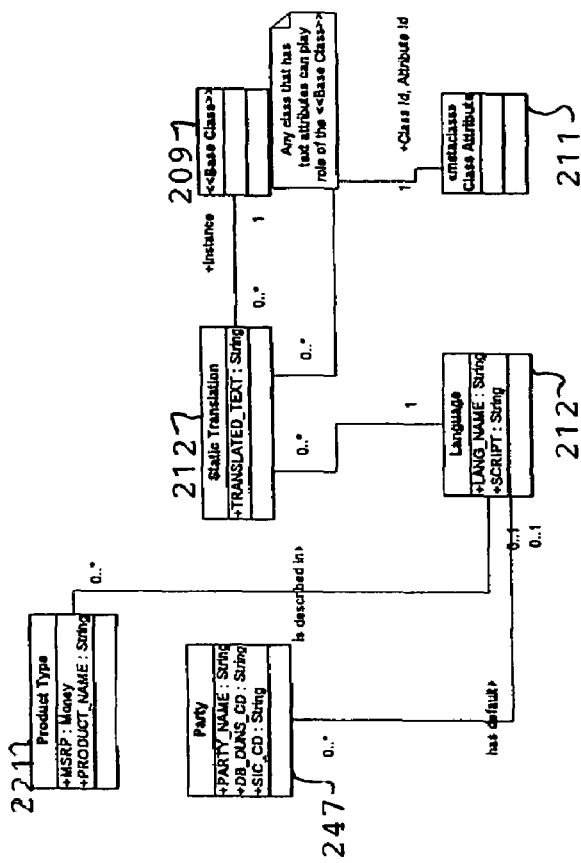
FIG. 8 is a UML diagram of the Multilingual Support data structure of the Universal E-Commerce Product Catalog.

FIG. 8 is a UML class diagram illustrating a multilingual support data structure of the universal e-commerce product catalog.

As shown in FIG. 8, text data may be stored in one of the supported languages (instances of Language class 212). A Base Class 209 represents text which may be associated with Static Translation class 210. There may be multiple static translations (instances of Static Translation class 210) between languages and text, up to one for each language supported. The classes and attributes which may be translated may be registered with Class Attribute metaclass 211. Party 247 may have an associated default language. Additionally, Language class may be associated with Product Type class 221.

Figure 9:
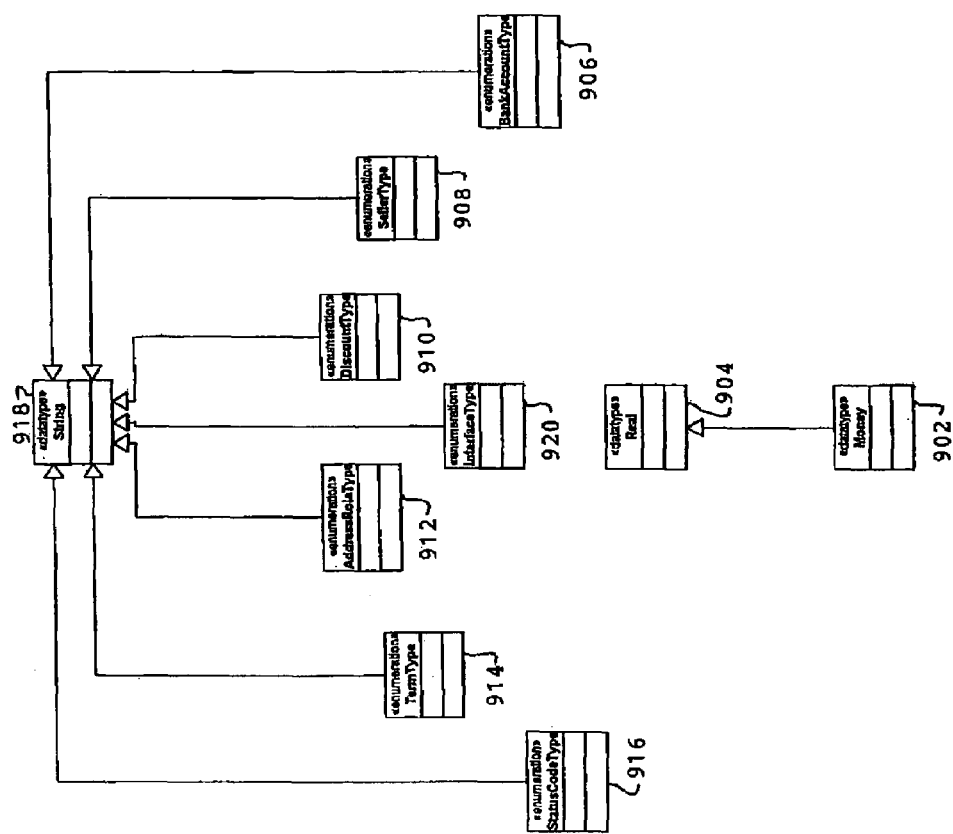
FIG. 9 is a UML diagram of the primary Data Types supported by the Universal E-Commerce Product Catalog.

FIG. 9 is a UML class diagram of the primary data types supported by the universal e-commerce product catalog.

As shown in FIG. 9, Money class 902 is a kind of Real class 904, i.e., the Money class is a child of the Real class. StatusCodeType, TermType, AddressRoleType, InterfaceType, DiscountType, SellerType and BankAccountType classes 916, 914, 912, 920, 910, 908 and 906 respectively are types of String class 918, (i.e., they are all children of the String class).

Six classes of Virtual Open Trading Extranet (VOTE) subscriber/users are envisioned. These are broadly defined as sellers, buyers, carriers, market data subscribers, government agencies and information providers.

Sellers may be herein defined as any manufacturer, exporter, distributor, broker or trade association which publishes listings of goods and products to electronic catalogs on the AgoraNet system.

Buyers may be herein defined as any importer, distributor, export agent, re-marketer or end-user organization that, having viewed and selected one or more products or/and services from vendor catalogs, express their intent to purchase these items by electronically submitting a purchase request or purchase order to the seller.

Carriers may be herein defined as any land, sea or air carrier or licensed freight forwarder which transports or ships goods.

Market data subscribers will subscribe to obtain standard or customized reports or to query VOTE for market data.

Government agencies may be herein defined as the procurement agencies of local, regional or national governments.

Information providers will provide data feeds, news, research and information which may be accessed by a subscriber.

Documents may be herein defined as electronic forms used by the AgoraNet system conforming to international and United States laws governing electronic commerce and which may be intended to have the same acceptance and legal standing as a written instrument.

Buyers who specify a particular product or class of products may establish conditions for purchase, such as price, and receive notification when the conditions are met or when changes in conditions occur.

DCE access-control lists may be used for multi-level access to catalog information.

Buyers who, having viewed and selected one or more products and services which they may be interested in purchasing, may electronically send a uniquely numbered purchase request document to the seller if no customer account exists with seller or if additional information is needed from seller before a purchase decision may be made. Such a purchase request may contain items such as special quantities, trade zones, insurance, shipping instructions, credit/payment information, buyer identification information, product availability, request for credit, banking details and other information.

Seller may electronically receive and respond to the purchase request with a corresponding uniquely numbered seller response document providing requested information to the buyer. The seller response document may request or specify additional information from a buyer, e.g., export credit insurance, letter of credit, payment or shipper information. Buyer may respond with a corresponding purchase request providing the requested data. Seller may additionally authorize that a uniquely numbered AgoraNet customer account including variables such as credit limit be established against which purchase order documents may be issued.

Sellers or buyers may issue shipping/forwarding rate request documents to prospective carriers in order to obtain quotations on packaging, freight costs and other charges.

Buyers, having obtained quotations for both product cost and shipping charges may arrive at their total landed (delivered) cost by requesting a landed cost calculation from VOTE. The landed cost calculation may begin with a conversion of product cost in United States dollars to the local currency based on an exchange rate calculation performed on an application server 102 computer. VOTE may provide a harmonized tariff number and rate of duty based on a calculation performed on application server 102.

VOTE may calculate the duty payable and any value-added taxes to arrive at the tax-paid value (TPV) based on calculations performed on an application server 102. Finally, VOTE may add delivery charges from warehouse to the final destination in order to provide buyer with a total landed cost based on calculations performed on an application server 102. Buyers may use VOTE to calculate total landed cost for equivalent products originating in different countries. Total landed cost calculations may be run before or after shipping & forwarding rate requests may be sent to prospective carriers. The actual number and sequence of calculations required in order to arrive at the total landed cost will vary by country but is performed at the application server.

All goods and services regardless of their country of origin may be quoted in United States dollars in VOTE. All goods and services may also be quoted in local currency with VOTE by using prevailing exchange rates to calculate to and from the local currency at the application server.

Seller may specify in the customer account which goods and services each buyer is authorized to purchase in addition to account variables such as credit limit.

Upon receipt of a uniquely numbered purchase order document from a buyer, seller has the option of final acceptance or, alternatively, notification to buyer (using the seller response document) indicating the purchase order should be modified in some way before final acceptance may occur. A uniquely numbered order confirmation document may be sent to confirm receipt and acceptance of an order.

Buyer may use the seller request to obtain a uniquely numbered blanket purchase order from seller against which individual purchase orders may be issued.

Upon partial or complete shipment of goods specified in an open purchase order by a United States based Seller, VOTE may transmit a uniquely numbered transaction data message using EDIFACT to United States Government systems in development including the Automated Export System (AES), Automated Commercial Environment (ACE) or International Trade Data System (ITDS). These systems are being designed to permit the electronic filing of export data to United States Customs and other federal government agencies.

In the event that a suitable interface to these systems is unavailable due to work-in-progress of one or more of these systems, VOTE will permit the seller to use their existing interface to the United States Customs Service to prepare shipping documents. When a complete or partial shipment of goods takes place, the seller or their agent may notify VOTE to generate a ship notification document electronically transmitted to the buyer.

Upon receipt of a uniquely numbered purchase order by a seller based in another AgoraNet subscribing country, VOTE may generate and send the aforementioned order confirmation message to the buyer. When notified by the seller or their agent of a complete or partial shipment of goods on an open purchase order, VOTE may provide an interface and uniquely numbered transaction data message to the United States Customs Service of that country permitting the electronic filing of shipping documents. A ship notification message may be sent to the buyer also.

VOTE may either input a purchase order to standard or customized supply chain management operating at an AgoraNet site or translate the order to XML, EDIFACT or X.12 for transmission to seller. Buyers may request modifications to or cancellation of an existing purchase order by submitting a uniquely numbered order revision request document to seller. Seller may respond using a seller response or a uniquely numbered purchase order modification document depending upon whether changes to the order revision request are accepted or require further revision.

VOTE may provide order tracking to buyers and sellers for goods in transit upon receipt of an order transit status request document. VOTE may respond with an order transit status document message. VOTE may obtain the order transit status information by means of electronic links to carrier order tracking systems.

For goods being imported into the United States, VOTE may provide interfaces to the United States Government Automated Commercial System (ACS) and Automated Broker Interface (ABI). ACS is the system used by the United States Customs Service to track, control and process all commercial goods entering the United States ABI is a component of ACS which allows importers to file import data electronically with the United States Customs Service. ABI enables United States Custom declarations to be processed electronically with a number of other functions. VOTE also supports the Automated Clearinghouse (ACH) electronic payment option enabling buyers and importers to pay customs fees, duties and taxes with one electronic transaction.

For goods being imported into other countries in which AgoraNet is deployed, VOTE may use EDIFACT syntax to describe customs declaration and invoice data.

Upon release from United States Customs and acceptance of goods by a buyer or their agent in the United States or other countries in which AgoraNet is deployed, the commercial invoice and other required documentation is transmitted to buyer bank and buyer account is debited. Buyer bank will, assuming it maintains an internal account with seller bank, credit this account. A SWIFT transaction message may be sent to seller bank debiting the internal buyer bank account and crediting the seller account. AgoraNet sites maintain interfaces with the SWIFT network in order to present commercial invoices and related documents to SWIFT member banks.

In the event that both buyer and seller maintain accounts with United States based banks, VOTE may issue a request to buyers bank to transfer funds to sellers bank using Fedwire.

VOTE may maintain transaction histories for subscriber accounts in accordance with United States and international record-keeping requirements. VOTE by virtue of its nature as a distributed database containing transaction data constitutes a data warehouse which market data subscribers and other classes of subscribers may access using an AgoraNet connection.

VOTE may provide order-input data to a subscribing organization supply chain management applications in one or two ways. The first is to input orders processed by VOTE to standard or customized commercial supply chain management software located at an AgoraNet site. The second is to translate the order to EDIFACT or X.12 format for transmission to the seller.

National Procurement and Resource Management (NPR), is a publish and subscribe AgoraNet system application which may facilitate the publication/distribution of government agency request for proposals and vendor responses to them. The application allows government agencies to publish RFPs for distribution to selected vendors, perhaps within a country or locality, or to publish them without restrictions. For example, a vendor might be allowed to subscribe to an agency bid list and receive bid documents automatically. This application also enables government agencies to publish information on selected land and structures for the purpose of seeking responses to RFPs which may involve new or re-development projects. Additionally, government or third party pre-auditing and approval of invoices prior to payment is a part of NPR.

NPR also permits government agencies to search all Seller electronic product catalogs published on the AgoraNet system for product information. Sellers who receive purchase orders from government agencies using NPR may file them using the same order processing and payment methods described earlier in the description of VOTE.

Both VOTE and NPR may use similar application server and database data models to support multilingual, multi-country and multi-customer operation. Both NPR and VOTE allow for real-time translation between languages using a combination of hard-coded translation values for standard words and reference values and commercial translating utilities for free-form text.

Multi-customer operation may be provided through implementation of customer tables pointing to the catalog inventory and transaction elements of the database. Implementing customer preferences, as may be required by trading partner agreements, enables multilevel access to seller catalog information. VOTE and NPR may support a flexible, complex inventory system capable of classifying catalog inventory items in different units.

VOTE and NPR may support many types of merchandise transfer. Under the generic term merchandise transfer, VOTE and NPR may support the aforementioned purchase request, purchase order, order confirmation, blanket purchase order and ship notification documents. VOTE and NPR may support transactions in United States dollars and local currencies. Exchange rate conversions may be supported for total landed (delivered) cost calculations and purchase orders.

VOTE and NPR may support DCE access-controls lists, which control the explicit access permissions granted to users and groups.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A method for facilitating worldwide commercial electronic commerce based on national deployment, comprising the steps of:
  A. receiving a request from a requester through a network for total landed cost of a purchase based on initial cost of a seller item for an inter-country transaction,
  B. determining, from a database, trade costs associated with the purchase by:
    performing an exchange rate calculation using the initial cost of the item and the currency type the requester prefers and the currency type the seller prefers,
    determining tariff for the item, from a database, based on the country the item is to be shipped from and the country the item is to be shipped to,
    determining delivery costs associated with the item, from a database, based on the country the item is to be shipped from and the country the item is to be shipped to,
    calculating value for duty to be added to the initial cost based on the country the item is to be shipped from and the country the item is to be shipped to,
    calculating value added taxes based on the country the item is to be shipped from and the country the item is to be shipped to, and
    determining purchase quantity to ascertain whether a special purchase price applies and adjusting the trade costs accordingly;
    determining customer type to ascertain whether a special purchase price applies and adjusting the trade costs accordingly; and
    determining whether any trading private or public partner agreements apply which govern the purchase price and adjusting the trade costs accordingly; and
  C. adding the trade costs, as adjusted as required, to the initial cost resulting in the total landed cost.

2. The method of claim 1, further comprising the steps of:
  receiving, through the network, an identity of a country the item is to be shipped from and an identity of a country the item is to be shipped to, and
  receiving, from the requester through the network, currency type the requester prefers and currency type the seller prefers.

3. The method of claim 1, further comprising the step of displaying, over the network, to the requester, the total landed cost.

4. The method of claim 1, wherein said step of determining tariff for the item further comprises the steps of:
  sending a request through the network containing an item description to the country the item is to be shipped to, and
  receiving, by the requester, through the network, the tariff information.

5. The method of claim 1, wherein said step of determining tariff for the item further comprises the step of:
  searching, in the database, a harmonized tariff schedule of the country the item is to be shipped to for the tariff associated to the item.

6. The method of claim 1, further comprising the step of:
  transmitting, through the network, the total landed cost to the requester.

7. The method of claim 1, further comprising the step of:
  displaying, through the network, the total landed cost.

8. The method of claim 1, wherein the requester is a potential buyer.

9. The method of claim 1, wherein the requester is the owner of the item.

10. The method of claim 1, wherein the item is a service.

11. The method of claim 1, wherein the item is a product.

12. The method of claim 1, further comprising the steps of:
  receiving, over the network, a request for comparison of total landed cost of an item in multiple countries,
  calculating total landed cost for the item in each country requested, and
  displaying, through the network, total landed cost of the item in each country requested.

13. The method of claim 1, further comprising the steps of:
  receiving a purchase order over the network, from the requester for the seller item,
  notifying the seller, through the network, the requester has agreed to purchase the seller item, and
  consummating a monetary exchange through the network.

* * * * *